United States Patent [19]

Moore

[11] 4,180,150
[45] Dec. 25, 1979

[54] MULTI-DIRECTIONAL TRANSFER DEVICE

[76] Inventor: Archie S. Moore, 3925 NE. 54th St., Kansas City, Mo. 64119

[21] Appl. No.: 845,876

[22] Filed: Oct. 27, 1977

[51] Int. Cl.² .................................. B65G 47/00
[52] U.S. Cl. .......................... 198/366; 193/35 MD; 198/787; 198/789
[58] Field of Search ............... 198/366, 349, 787, 854, 198/365, 789; 193/35 MD

[56] References Cited

U.S. PATENT DOCUMENTS

| | | | |
|---|---|---|---|
| 1,460,539 | 7/1923 | Edwards | 198/787 X |
| 1,475,962 | 12/1923 | Olson | 198/366 |
| 1,795,137 | 3/1931 | Nye | 198/366 X |
| 2,624,445 | 1/1953 | Wallman | 198/789 X |
| 3,170,562 | 2/1965 | Eyster | 198/787 |
| 3,565,233 | 2/1971 | Hinman | 198/366 X |
| 3,610,159 | 10/1971 | Fickenscher | 198/349 X |
| 3,983,988 | 10/1976 | Maxted et al. | 198/365 |

FOREIGN PATENT DOCUMENTS

| | | | |
|---|---|---|---|
| 2052960 | 7/1971 | Fed. Rep. of Germany | 198/366 |
| 178446 | 3/1962 | Sweden | 198/854 |

Primary Examiner—Robert B. Reeves
Assistant Examiner—Douglas D. Watts
Attorney, Agent, or Firm—Fishburn, Gold & Litman

[57] ABSTRACT

A device for transferring articles from one conveyor onto a second conveyor or a discharge station which comprises a field of single wheels that support the articles during the transfer thereof, each of the wheels being tilted and drivable, and steerable in a horizontal plane. The wheels can be adapted for steering through any desired angular range, i.e., 90°, less than 90°, or up to and including 360°, or greater. Accordingly, articles received on the present tranfer station from an incoming conveyor can be discharged therefrom at a right, acute or obtuse angle, in either a curved or straight path, and a control feature can be included with the transfer station whereby horizontal alignment of an article on its vertical axis can be maintained or altered according to preference.

5 Claims, 14 Drawing Figures

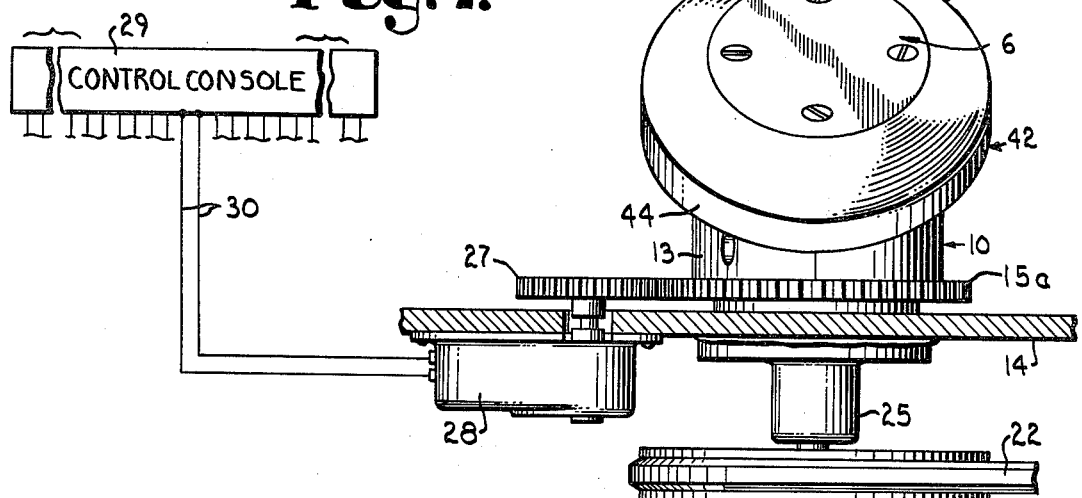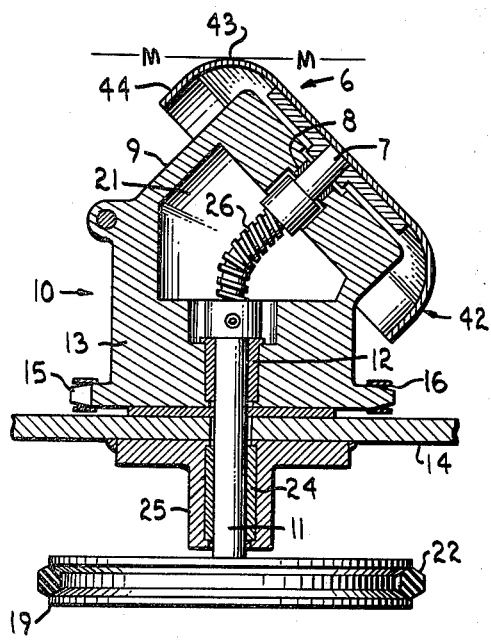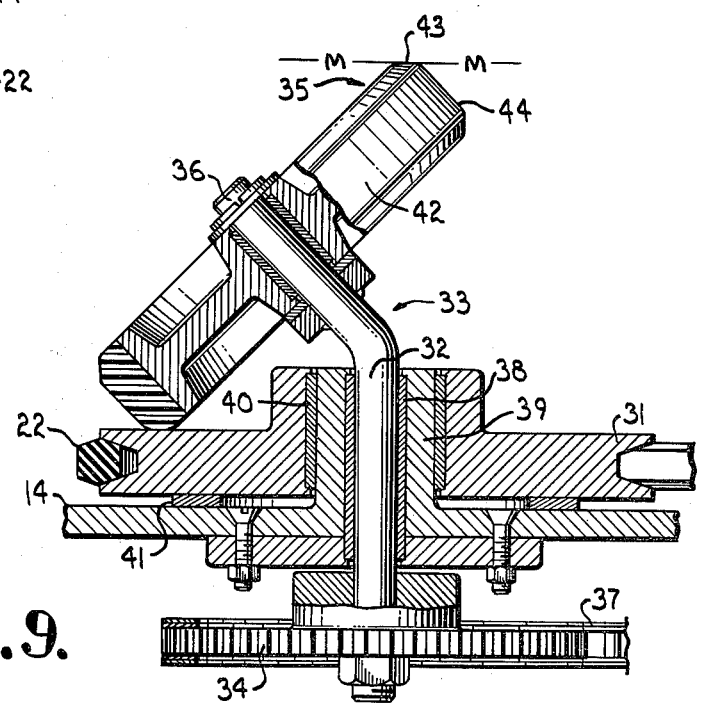

MULTI-DIRECTIONAL TRANSFER DEVICE

BACKGROUND OF THE INVENTION

The present invention pertains to conveying apparatus, and more particularly, pertains to a transfer station whereby articles carried on a conveyor are transferred in a relatively angular direction onto a second conveyor or a discharge station.

Belt or roller conveyors are widely used for conveying articles such as luggage, parcels, cartons, packaged items in warehouses, and components and assemblies in factories. For controlled routing and delivery of the articles being conveyed, it is frequently necessary to transfer them at an angle onto still another conveyor, or onto a discharge station once they have reached their destination. Prior mechanical devices for effecting such angular transfer have been expensive to build, and in many instances have not been adequately reliable mechanically. There has also been limitation with respect to selectivity of the angle at which the article can be transferred, since typical transfer stations have been designed to move the article sideways at a fixed angle which, in most cases, is a right angle. Another shortcoming of prior transfer stations is their inability to turn articles on their vertical axis and thus change the horizontal orientation of the article so that one side thereof can be turned to face in a desired direction each time a transfer is made. Such horizontal reorientation is useful in visually monitoring the articles and/or orienting the articles for storage in a particular pattern or arrangement.

SUMMARY OF THE INVENTION

It is therefore an object of this invention to provide an improved conveyor transfer station which overcomes the aforementioned disadvantages of prior transfer stations.

Another object is to provide a conveyor transfer station which includes driven wheels for conveying an article thereon during transfer of the article.

Still another object is to provide a conveyor transfer station which steers an article in a selected horizontal direction during transfer of the article.

Yet another object is to provide a conveyor transfer station that permits selection and control of the angle at which an article thereon is steered from transfer of the article.

Even another object is to provide a conveyor transfer station which effects angular transfer of an article therefrom while either maintaining or altering the horizontal orientation of the article about its vertical axis.

Another object is to provide a conveyor transfer station which can rotate an article about its vertical axis through 360° or more while the article rests thereon.

Yet another object is to provide a conveyor transfer station that can be controlled electrically and thereby adapted for use in an automated conveyor system.

The present invention is a transfer station for transferring articles from one conveyor onto a second conveyor or discharge station, and comprises a field of single wheels that support said articles during transfer, each of the wheels being tilted and drivable, and steerable in a horizontal plane so as to affect the movement, in any desired direction, of the transported articles.

BRIEF DESCRIPTION OF THE DRAWINGS

FIG. 7 is an elevational front view of a tilted wheel assembly that can be used with the transfer station of FIG. 1, and shows use of a gearmotor drive for steering the wheel, and a control console whereby steering of a plurality of such wheels can be steered either independently of each other or in combination.

FIG. 8 is an elevational side view, in section, of a drivable and steerable tilted-wheel assembly which comprises a flexible coupling between the drive shaft and the drive axle of the wheel.

FIG. 9 is an elevational side view, in section, of an accordant wheel assembly which has a tilted wheel that is driven by contact of the rim thereof with a belt driven sheave.

DESCRIPTION OF PREFERRED & ALTERNATIVE EMBODIMENTS

Figure 1:
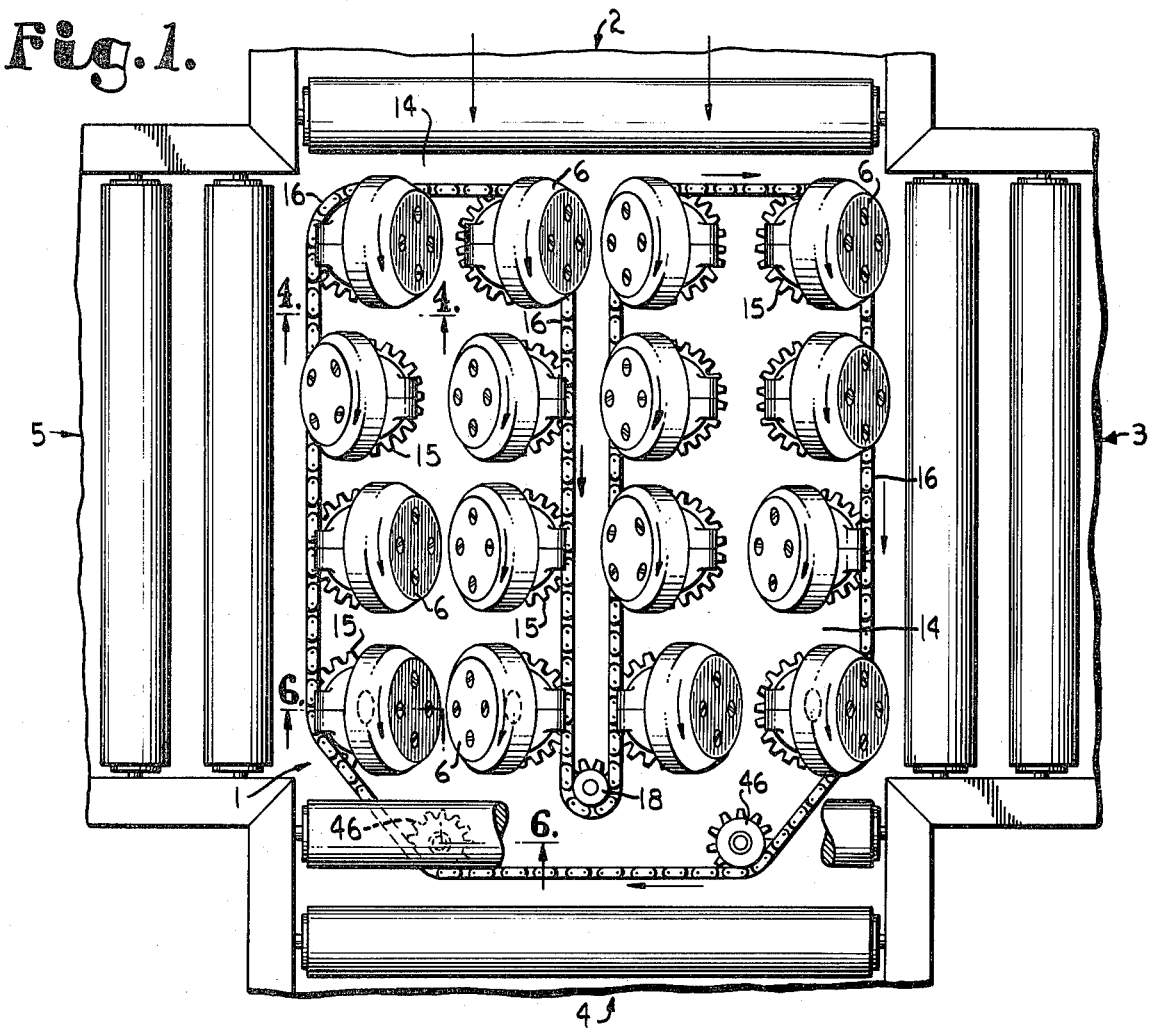
FIG. 1 is a top plan view of a transfer station constructed in accordance with the present invention, and shows the tilted wheels of the field and part of the steering mechanism therefor.

In FIG. 1, the transfer station is generally represented at 1, and resides at the distal end of an incoming conveyor 2 and at the proximal end of three outgoing conveyors 3, 4 and 5. In the illustrated case, the transfer station is used to transfer articles received from the incoming conveyor 2 onto one of the outgoing conveyors 3, 4 and 5, depending on the desired destination of each article.

Figure 2:
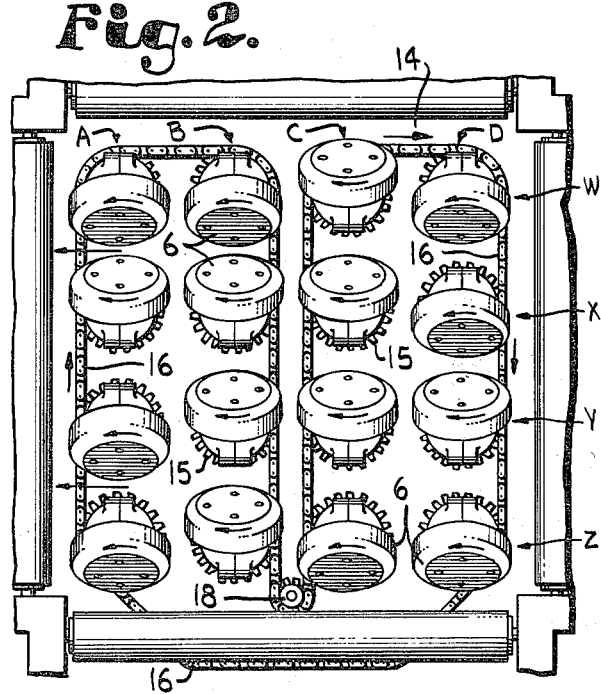
FIG. 2 is a top plan view of the transfer station of FIG. 1 and shows the tilted wheels after they have been steered 90° clockwise from the orientation shown in FIG. 1.

As was previously indicated, the transfer station comprises a field of single, tilted wheels 6. As shown in FIG. 2, the wheels of the field are aligned in rows of four across—A,B,C,D—and four deep—W,X,Y,Z. Fewer or greater rows can be employed in either direction, or patterns other than rows can be used if preferred, but any given field should contain at least 3 single, tilted wheels that are drivable and also steerable in a horizontal plane.

The term "single wheel" as used herein is intended to mean a wheel that effects desired thrust vectors for horizontal linear and rotational movement of an article on the field of wheels, without having to function in combination with a paired wheel which supplies another vector in a different direction to effect a desired thrust vector which is a resultant of both vectors produced by the two wheels. Although the invention thus obviates the need for paired wheels which deliver multi-directional thrust vectors, it will nonetheless be appreciated that a plurality of single wheels is employed in the present field of wheels to lend sufficient support to the article being transferred, and to provide adequate thrust for horizontal linear and rotational movement of the article by combination of unidirectional thrust vectors.

Figure 3:
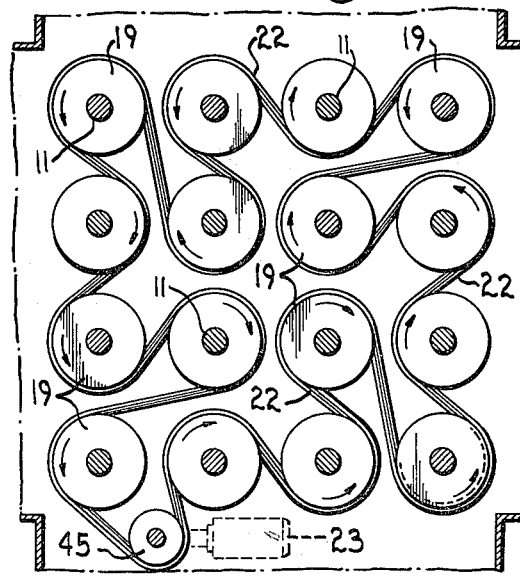
FIG. 3 is a horizontal sectional view of the transfer station of FIG. 1 and shows the drive means employed for driving the tilted wheels of the field.
Figure 4:
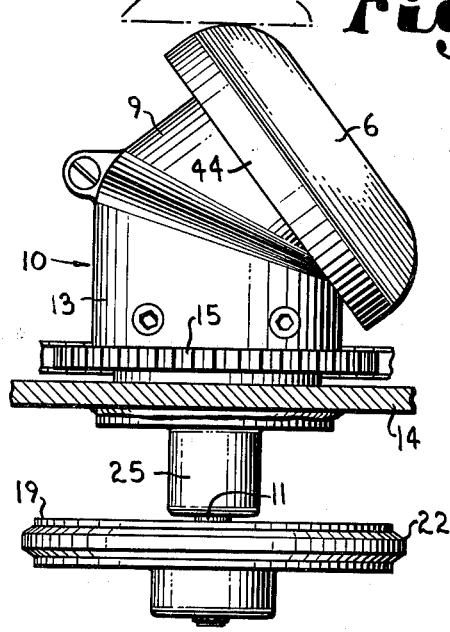
FIG. 4 is an elevational side view of a drivable and steerable tilted-wheel assembly that can be employed with the transfer station of FIG. 1
Figure 5:
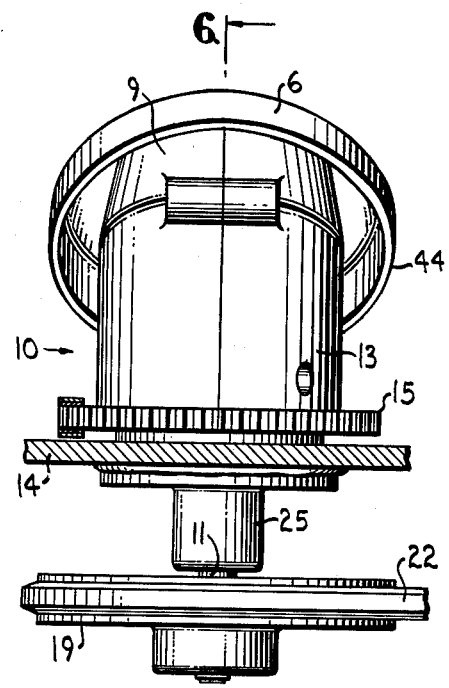
FIG. 5 is an elevational rear view of the wheel assembly shown in FIG. 4.
Figure 6:
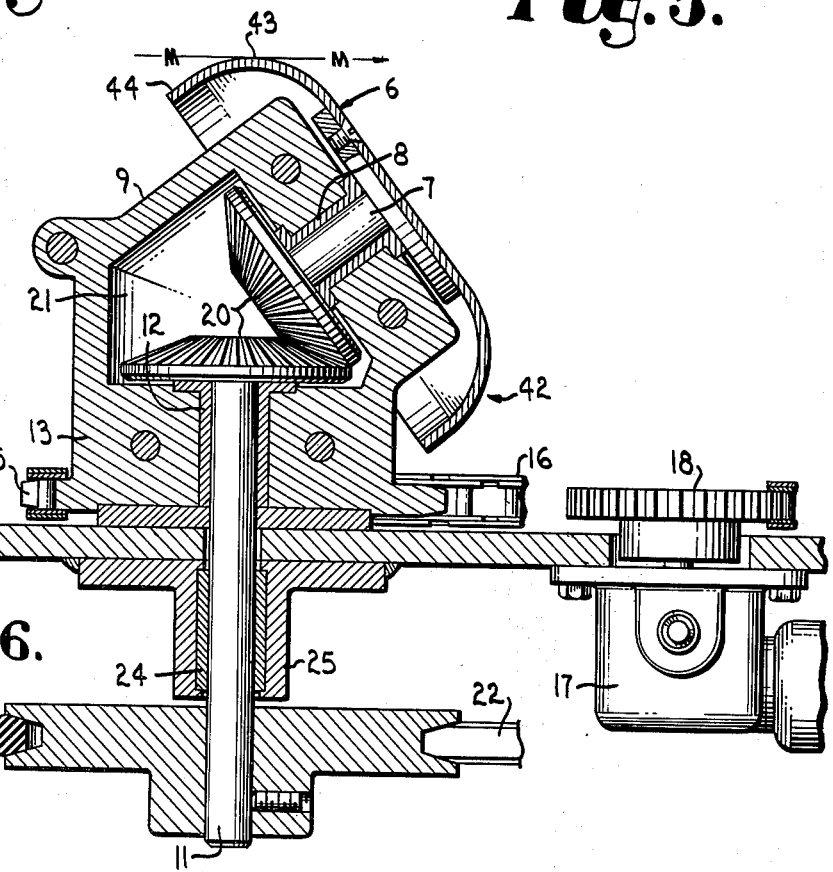
FIG. 6 is an elevational side view, in section, of the wheel assembly shown in FIG. 4.

One type of wheel assembly that can be used with the transfer station of FIG. 1 is illustrated in FIGS. 4, 5 and 6. The tilted wheel 6 is mounted on a tilted axle 7 that extends through a bushing 8 in a tilted upper section 9 of an axle mount 10. A drive shaft 11 extends vertically through a second bushing 12 in a vertically disposed lower section 13 of the axle mount, the mount being rotatably mounted on the upper side of a support plate 14 for rotation around the drive shaft 11 for the purpose of steering the wheel 6 in a horizontal plane. Such steering is accomplished by means of a steering wheel 15 that is mounted on the lower section 13 of the mount in coaxial relationship with drive shaft 11. In the illustrated case, the steering wheel 15 is a tooth sprocket that is turned by a meshing chain 16 when driven by a gearmotor 17 having a drive sprocket 18 thereon. Turning of the wheel 6 on its axle 7 is accomplished by rotation of a sheave 19 attached to the lower end of drive shaft 11, with rotational force being transmitted to the wheel axle 7 and the attached wheel 6 by means of bevel gears 20 mounted on the upper end of the drive shaft and the lower end of the axle within housing 21 of the mount. The sheave 19 is driven by a belt 22 and a gearmotor shown at 23 in FIG. 3. Drive shaft 11 is stabilized vertically by means of bushing 24 in a stationary shaft mount 25 affixed to the lower side of support plate 14.

FIG. 8 illustrates a wheel assembly having the same construction as shown in FIGS. 4, 5 and 6 except that a flexible coupling 26 is used to interconnect the drive shaft 11 with the tilted axle 7 of the wheel 6. FIG. 7 also illustrates a like wheel assembly, except that the steering wheel 15a is a ring gear that is turned by a drive gear 27 mounted on a gearmotor 28, and the gearmotor is controlled from a console 29 from which any number of other gearmotors that steer wheel assemblies can also be controlled. Interconnection of the console and the gearmotor is through electrical control leads 30.

A somewhat different wheel assembly is shown in FIG. 9 wherein a drive wheel in the form of a sheave 31 is rotatably mounted on the vertically disposed lower end 32 of the axle mount 33 above the steering wheel 34. In addition, the sheave 31 is located below the tilted wheel 35 that is mounted in axle 36 at the upper end of the mount 33. Accordingly, the rim of the tilted wheel 35 is positioned for frictional contact with the sheave, so that upon rotation of the latter, the tilted wheel is thereby rotated. Rotation of the axle mount 33 for steering the wheel 35 is achieved by turning the steering sprocket 34 on the axle mount with a driven chain 37, as previously described. The axle mount is stabilized vertically by means of a bushing 38 which extends through a stationary sleeve portion 39 of the mount that is attached to mounting plate 14. The sheave 31 is stabilized on sleeve portion 39 by means of a bushing 40 thereon and a bearing 41. Sheave 31 is rotated by means of a belt 42 that is driven with a motor, as previously described.

Each of the tilted wheels shown in the drawings has a circumferential rim 42 with one surface section 43 that tangentially intersects a horizontal plane M through which a conveyed article moves, and another surface section 44 below the horizontal plane M, such orientation being evident when viewed from the uppermost elevation of the rim 42. Rim section 43 which is tangent to plane M has a relatively narrow width, and when the tilted wheel is in a fixed position, there is little or no tendency for it to turn an article on its vertical axis merely by the rotation of the wheel on its axle. More specifically, all steering of articles on the field of wheels is not accomplished by the configuration of the wheels, but rather by steering of the wheels themselves, as will be more fully described later on.

Figure 10:
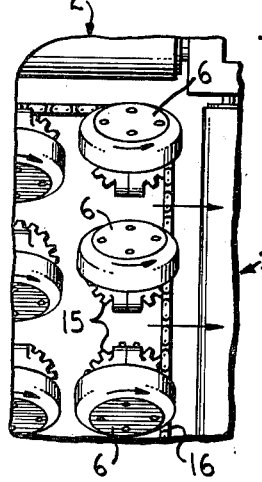
FIG. 10 is a top plan view of the transfer station of FIG. 1 and shows the tilted wheels after they have been steered 270° clockwise or 90° counterclockwise from the orientation shown in FIG. 1.

FIG. 3, illustrates the mechanism for driving of the wheels 6 in the field of wheels. Drive motor 23 turns a sheave 45 that drives the belt 22 that is emplaced on each sheave 19 of the drive wheels 6. As shown in FIG. 3, the belt 22 is arranged on the sheaves 19 in such a fashion that each wheel 6, when orientated as shown in FIGS. 1, 2 and 10, is rotated in the same direction at the same time as illustrated by the arrows. Alternatively the use of a single belt, two or more belts can be used with two or more drive motors, or chain or gear drives can be used, or each wheel can be driven by means of an individual motor.

FIGS. 1, 2 and 10 illustrate the field of wheels 6 of the transfer station and the steering mechanism for the wheels. As was previously indicated, steering is accomplished by means of a chain and sprocket mechanism; more specifically, the chain 16 is driven by means of a gearmotor 17 (FIG. 6) having a drive sprocket 18, and the chain meshes with each of the steering sprockets 15 on the axle mounts of the wheel assemblies. Tension in the chain is maintained by means of idler sprockets 46. As shown in FIGS. 1, 2 and 10, the chain 16 is arranged on the steering sprockets 15 so that all of the axle mounts 10 (FIGS. 4, 5 and 6) are rotated on their vertical axes in the same direction at the same time. Movement of the chain is illustrated by the arrows in FIG. 1, and FIG. 2 illustrates the wheels after they have been steered 90° clockwise relative to the position shown in FIG. 1 and FIG. 10 shows the wheels after they have been steered 270° clockwise relative to FIG. 1.

Steering of the wheels to a desired angle is thus accomplished by operation of the steering gearmotor 17, and it will be readily apparent that by use of the continuous chain 16 the axle mounts 10 and the attached wheels can be caused to rotate around the vertical axis of the mounts for as long as the gearmotor runs, hence permitting steering of the wheels through angles of less than 90°, 90°, more than 90°, up to 180°, up to 270°, up to 360°, or more than 360° depending on the interval of time that the gearmotor is operated. On the other hand, the axle mounts 10 will not turn readily on their vertical axes when the gearmotor is not running, being effectively held at a fixed angle by chain 16, sprockets 15 and gearmotor drag until the system is again operated.

In an exemplary operation, the wheels 6 can first be steered to a position as shown in FIG. 1 for receiving articles on the transfer station 1 from the incoming conveyor 2. Drive motor 23 is activated to effect rotation of the tilted wheels 6 in the direction shown by the arrows. When an article is to be passed on from the transfer station to outgoing conveyor 4, there is no need to steer the wheels to a different angle than shown in FIG. 1. The article will rest on the driven wheels 6 and will be straightly conveyed from conveyor 2 to conveyor 4 by driven rotation of the wheels 6 on their axles. When the article is to be transferred to conveyor 5, the gearmotor 17 is momentarily operated until the axle mounts 10 are turned through 90° and the wheels 6 are thus steered to the orientation shown in FIG. 2, this being accomplished before the article is conveyed off the transfer station by driven rotation of the wheels on their axles. Where preferred, a control means can be provided whereby operation of the motor 6 for driving the wheels for transfer of the article onto an outgoing conveyor is temporarily interrupted during steering of the wheels, thereby permitting ample time to effect steering to a desired angle before the article is driven off the transfer station. It will be appreciated that when an article is to be transferred onto conveyor 3 that the same steering procedure is followed as for transfer onto conveyor 5 except that the steering gearmotor is operated for a longer period of time to effect steering of the wheels through 270° to a position as shown in FIG. 10.

Operation of the gearmotor at the appropriate time and for an interval of time that effects steering to the desired angle can be accomplished by manual switching means, through use of an optical scanner and a programmed computer which effects automatic operation of gearmotor 17 for aproper interval following examination of the article by the scanner, or by means of microswitches or load cells which are actuated by articles of different sizes or weights, respectively, and which accordingly effect operation of the steering gearmotor for an interval which effects proper routing of the article. Other means for operating the steering gearmotor for the purpose of routing the articles can be used where preferred.

It will be apparent from the above description that the tilted, driven wheels of the present transfer station will exert horizontally directed linear thrust on a flat bottomed article to convey the article off the station, and by steering the wheel the horizontal direction of travel of the article can be altered to effect its transfer off the station in an angular direction with respect to the path of travel onto the station. It will also be apparent that steering of the wheels while an article rests on the transfer station directs a rotational thrust on the bottom of the article that is directed horizontally around its vertical axis. It should be pointed out, however, that use of this rotational thrust for turning the article on its vertical axis is optional, depending on whether such turning is preferrable or not for respectively altering or maintaining the orientation of the sides of the article with respect to specific points on the horizon.

When turning of an article on its vertical axis by steering of the wheels is not preferred, such can be prevented in one of several ways. Means can be employed which temporarily grip or rest against the article to prevent rotation thereof when the wheels are being steered, later to be released or removed from the articles when the steering sequence is completed. Another method of preventing rotation of an article resting on the wheels is to effect steering of the wheels with sufficient rapidity whereby rotation of the article is prevented by the static inertia thereof. Rotation can also be prevented by steering half the number of rows of wheels in one direction while steering the other rows at the same time and through the same number of degrees, but in the opposite direction whereby rotational thrust of one set of rows is cancelled out by the counterrotational thrust of the other set of rows. This latter method, though effective without use of other means for preventing rotation, requires use of a separate drive system for each set of oppositely steered rows, and means for reversing the direction of one of the drive systems when the rows are steered in opposite directions.

Figure 11:
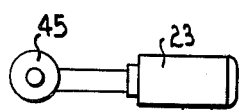
FIG. 11 is a somewhat schematic representation of a means for controlling the drive motor for the wheels of the transfer station of FIGS. 1–6.

When it is preferred that an article on the transfer station be rotated on its vertical axis by steering of the wheels, such as accomplished by steering at a slow enough rate whereby the rotational thrust exerted by the wheels is able to overcome the static inertia of the article. If the rate at which the article is moved in a horizontal linear direction by the transfer station is such that the article cannot be sufficiently rotated by steering of the wheels before the article is conveyed off the station, means can be employed for temporarily diminishing the speed of the drive motor so that rotation of the wheels, for conveying the article, can be slowed or stopped until steering is completed. As shown in FIG. 11, slowing or stopping of the drive motor can be accomplished manually by means of a rheostat 46 that is wired in parallel with electric leads 47 which supply power to drive motor 23. Electronic and/or automatic speed control means can be used if preferred.

Figure 12:
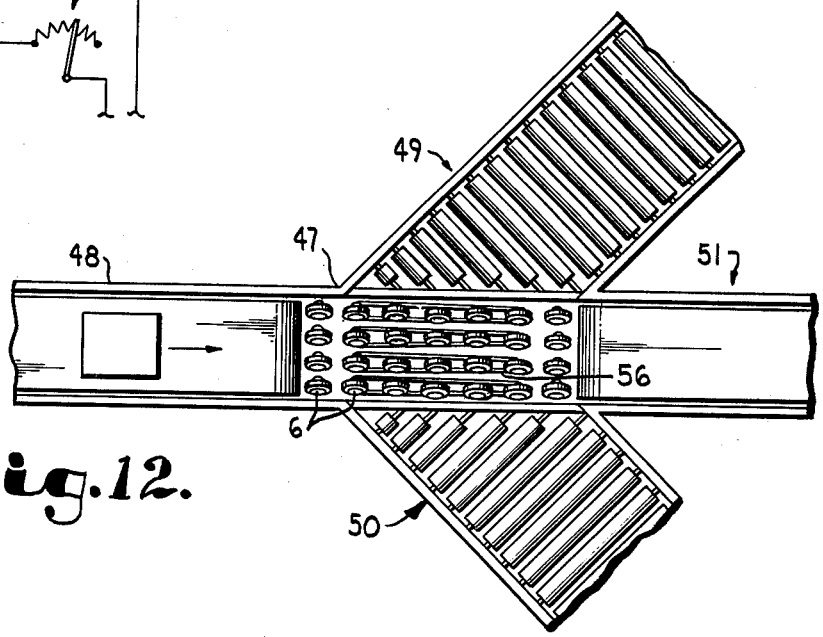
FIG. 12 is a top plan view of another embodiment of the transfer station of the present invention.
Figure 13:
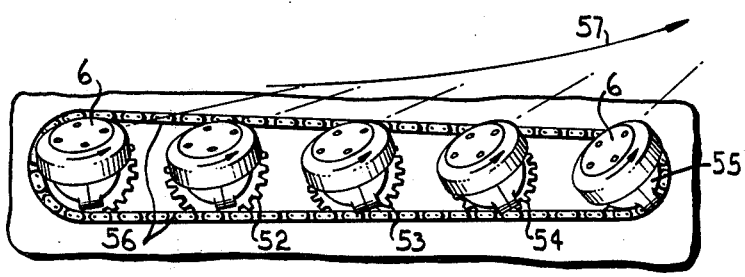
FIG. 13 is a fragmentary top plan view of one row of wheels used with the transfer station of FIG. 12.

The drawings illustrate a transfer station having a field of wheels 6 mounted on tilted axles 7 and wherein the orientation of the axles and wheels to each other is established and maintained in a parallel relationship, i.e. the axles and wheels are not skewed out of alignment. Accordingly, the wheels can be steered to an acute, right, or obtuse angle relative to an initial direction of travel, for conveying an article off the transfer station in a linear path. Means can also be provided, however, for skewing the axles and wheels so that an article on the transfer station can be conveyed in a curving path. In FIG. 12 a transfer station 47 receives articles from an incoming conveyor 48 and transfers them onto outgoing conveyors 49 or 50 which lead off at an obtuse angle, or onto outgoing conveyor 51 that leads straight ahead. FIG. 13 illustrates a row of wheels 6 used with the transfer station of FIG. 12, and each wheel in the row has a smaller steering sprocket 52, 53, 54, 55, than the next, viewed left to right. Each of the steering sprockets is turned by a continuous chain 56 that is driven by a steering gearmotor, not shown. When the gearmotor is operated, the smaller sprockets are rotated further on their axes for any given length of travel than the larger sprockets, and this results in a skewing of the wheels as shown in FIG. 13, and an article on the transfer station can thus be caused to turn at a gradually increasing angle, as represented by curving arrow 57, for transfer through a curving path onto conveyor 49. Accordingly, the wheels comprised by the field of the transfer station 47 are arranged in rows, and steering means is adapted for parallel alignment of the wheels for establishing a straight path of travel, or selectively skewing the wheels in each row to establish a curved path of travel for an article on the field, and the degree of skew of a given wheel in a row is less than that of the next wheel located further along the path followed by the article on the field. Alternatively to use of the steering means shown in FIG. 13, each wheel can be steered by means of a separate gearmotor as shown in FIG. 7, while making use of a manual or programmed unit 29 to control the angle to which each wheel is turned to achieve the desired skew.

Figure 14:
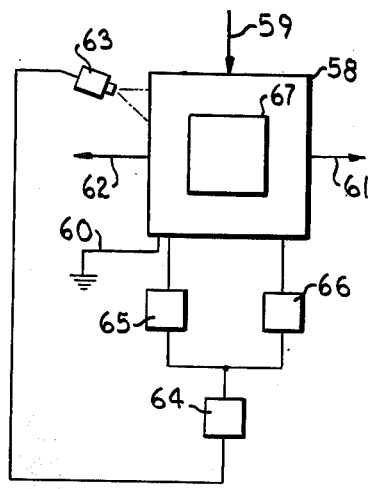
FIG. 14 is a schematic diagram of an automatic conveying system wherein the present transfer station is used for routing articles to outgoing conveyors or a discharge station.

As was previously indicated, the present transfer station is adaptable for use in automated conveyor systems for selective routing of articles onto a plurality of conveyors or a distribution station. Such a system is diagramatically illustrated in FIG. 14 wherein a transfer station constructed in accordance with FIGS. 1-6 is represented at 58, an incoming conveyor at 59, a distribution station at 60, and outgoing conveyors at 61 and 62. The television scanner is represented at 63, a computer at 64, means for steering the wheels of the transfer station at 65, and means for driving the wheels at 66. When an article 67 passes onto the transfer station, the scanner 63 functions as an inspection means to detect an identifying shape or coded label on the article, and a signal is transmitted by the scanner to the computer 64 via line 68, and by following a program the computer functions as a routing means in that it controls the steering means 65 and/or drive means for steering the article 67 onto the proper output conveyor or the discharge station, depending on the identity of the article. If necessary, the program can include provisions whereby the article is caused to be turned on its vertical axis by the steering means until its identity is fully confirmed by the computer for the purpose of proper routing. A multiplicity of transfer units as shown in FIG. 14 can be used in combination for fully automating large warehouses wherein many articles of different types, shapes and sizes are stored.

A transfer station which fulfills the previously stated objects has now been described in detail, and although the description has been with reference to particular embodiments, it will nonetheless be understood that other embodiments of the present invention will become apparent which are within the spirit and scope of the following claims.

What is claimed and desired to secure by Letters Patent is:

1. A transfer station for transferring articles from a conveyor,
    (a) said transfer station comprising a field of single wheels that support said articles during the transfer thereof, each of said wheels being tilted and drivable, and steerable in a horizontal plane,
    (b) each of said wheels being attached to a tilted axle that is supported by an axle mount, said mount having a vertically disposed lower section with a steering wheel attached thereto, said steering wheel having a vertical axis,
    (c) a support member on which said lower section of the axle mount is rotatably mounted, and
    (d) a driving wheel rotatably mounted on said vertically disposed lower section of the axle mount above said steering wheel and below said wheel attached to the axle, the rim of said wheel attached to the axle being in frictional contact with the hub of the driving wheel and turned by rotation thereof.

2. A transfer station for transferring articles from a conveyor, said transfer station comprising a field of single wheels that support said articles during the transfer thereof, each of said wheels being tilted at a non-vertical fixed angle from a horizontal plane and drivable, and steerable in a horizontal plane about an upwardly projecting axis, said field of single tilted wheels being positioned in a plurality of rows with individual wheels in a single row being tilted in opposite directions but driven for article movement in the same direction.

3. A transfer station for transferring articles from a conveyor, said transfer station comprising a field of single wheels that support said articles during the transfer thereof, each of said wheels being tilted at a non-vertical fixed angle from a horizontal plane and drivable, and steerable in a horizontal plane about an upwardly projecting axis, said field of single tilted wheels being positioned in a plurality of rows with individual adjacent wheels in separate rows being tilted in opposite directions but driven for article movement in the same direction.

4. A transfer station for transferring articles from a conveyor, said transfer station comprising a field of single wheels that support said articles during the transfer thereof, each of said wheels being tilted at a non-vertical fixed angle from a horizontal plane and drivable, and steerable in a horizontal plane about an upwardly projecting axis, said wheels being driven through drive shafts and including an endless flexible drive member operably associated with said drive shafts and simultaneously driving selected drive shafts in opposite directions.

5. A transfer station for transferring articles from a conveyor, said transfer station comprising a field of single wheels that support said articles during the transfer thereof, each of said wheels being tilted at a non-vertical fixed angle from a horizontal plane and drivable, and steerable in a horizontal plane about an upwardly projecting axis, selected wheels being tilted in opposite directions and such wheels tilted in opposite directions are steered simultaneously by angular displacement in the same direction.

* * * * *